June 22, 1965     H. MUTH     3,190,285
CONSTRUCTION OF A BATTERY ELECTRODE FOR AN ENDO-RADIOSONDE
Filed May 12, 1961
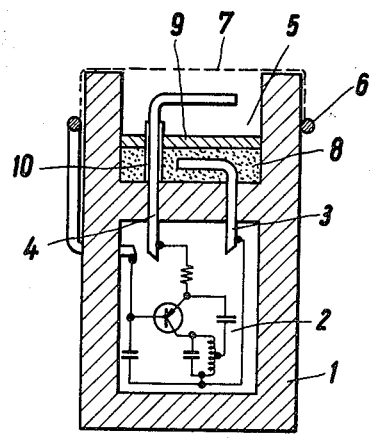
Herbert Muth
Inventor
by: George B. Spencer
Attorney

United States Patent Office 3,190,285
Patented June 22, 1965

3,190,285
CONSTRUCTION OF A BATTERY ELECTRODE FOR AN ENDO-RADIOSONDE
Herbert Muth, Neu-Ulm-Offenhausen, Germany, assignor to Telefunken Patentverwertungs-G.m.b.H., Ulm (Danube), Germany
Filed May 12, 1961, Ser. No. 109,746
Claims priority, application Germany, May 19, 1960, T 18,408
6 Claims. (Cl. 128—2.1)

This invention relates to an endo-radiosonde i.e., a transmitter produced in pill form which may be swallowed for stomach and/or intestinal examinations, wherein information about a value to be measured, as, for example, the pH value of intestinal fluids, is radiated by means of a coil associated with the sonde and is received in the vicinity of the body of the patient, for example, by means of one or several coils connected with an appropriate receiver. A battery is provided in the endo-radiosonde for operating the transmitter circuit.

More particularly, the invention is concerned with the construction of the electrodes of the battery of the above-described endo-radiosonde. In an endo-radiosonde already known, the battery comprises a magnesium electrode and a silver chloride electrode, arranged in an appropriate electrolyte such as a common salt solution. However, this arrangement has the drawback that shortly after the electrolyte is introduced, hydrogen separates at the magnesium electrode. The major portion of the gas formation does not depend upon the current consumption from the battery. Rather, the gas formation in only a slightly attenuated form occurs a short time after the introduction of the magnesium electrode into an electrolyte. The passage of current only supports this gas formation. It is readily understandable that a gas formation to this extent is particularly undesirable in an endo-radiosonde because gas in the battery chamber may cause incorrect measurements or even a complete breakdown of measuring process.

It is known to use pyrolusite (manganese dioxide) for the removal of hydrogen gas. However, in order to remove gas formed at the magnesium electrode over a longer period of time, a relatively large amount of pyrolusite must be provided, and a large amount of pyrolusite requires a large space that simply does not exist in the endo-radiosonde, because the trend of development as well as the demands of the medical profession are toward an endo-radiosonde which is as small as possible. The above-described phenomena apply, of course, not only to the electrode materials mentioned above, but they occur also in other electrode materials. However, using the above-mentioned materials has the advantage that a relatively large battery voltage is available and that, moreover, the discharge curve of this battery is especially suitable for the desired use.

Accordingly, it is a primary object of the invention to remedy or at least to alleviate the problems caused by this gas formation.

According to the invention, this is accomplished by minimizing the gas formation at one battery electrode by constructing it of a known alloy composed of the electrode substance proper and a relatively small percentage of one or several substances that reduce the gas formation. According to a preferred embodiment of the present invention, the electrode is constructed of an alloy of magnesium and a small percentage of manganese, and the electrode thus produced is treated for some time before use with electrolytic fluid.

The use of one of the above-mentioned alloys reduces the gas formation at the electrode quite considerably. Finally, the gas formation at this electrode when no current is flowing may be completely prevented by placing the electrode produced from the above-mentioned alloyed material in an electrolyte, for example a common salt solution, before its use as a battery electrode in the endo-radiosonde, and permitting it to remain there for at least twenty minutes, and preferably one to two hours. After this treatment, gas formation without passage of current at the electrode is practically completely eliminated. After only twenty minutes, the gas formation is markedly reduced.

As already mentioned, a small amount of hydrogen gas is nevertheless formed when current from the battery is consumed. As is known in the art, the accumulation of hydrogen gas is removed by embedding the electrode in pulverized pyrolusite. For the small amount of gas to be removed, a small amount of pyrolusite is sufficient, so that difficulties due to space limitation no longer arise.

According to a further development of the invention, the portion of the pyrolusite surface not bounded by the battery housing is covered with an absorbent paper. There are two reasons for this: (1) the pyrolusite powder may be retained in the desired position around the electrode produced from the alloy, and (2) the absorbent paper has the effect of greatly expediting the penetration of the electrolyte into the pyrolusite powder and the mixture of the two substances when the electrolyte is introduced. Without absorbent paper, the liquid drops would remain on the powder for a period of time. The absorbent layer overcomes the surface tension of the drops of electrolyte and enhances the penetration of pyrolusite particles into the layer, thereby greatly expediting the mixing.

However, embedding one electrode in pyrolusite has the drawback that a waste current flows between the two electrodes as soon as the second electrode is passed through the pyrolusite layer. This is so because the pyrolusite still contains impurities. In order to eliminate this undesirable phenomenon, the second electrode is insulated along its portion passing through the pyrolusite layer. This may be done by using a rubber coating or a layer of varnish, or the like.

Additional objects and advantages of the present invention will become apparent upon consideration of the following description when taken in conjunction with the accompanying drawing, in which the single figure is a vertical sectional view, partially diagrammatic, through an endo-radiosonde constructed in accordance with the principles of the invention.

In the drawing, the housing 1 of the endo-radiosonde is shown as having a chamber 2 containing the circuit elements necessary for the transmitter circuit. One embodiment of an oscillator circuit is illustrated diagrammatically. Since such circuits are well known, no detailed explanation thereof is deemed necessary.

Projecting into this chamber are an electrode 3 made of alloyed material and an electrode 4 made, for example, of silver chloride. The electrodes are connected with the oscillator circuit, the upper portions of which form a battery for operating the oscillator circuit when an electrolyte is placed into the chamber 5. In the embodiment shown, the electrode 4, together with an antimony electrode 6, forms the pH measuring assembly. The voltage generated across these two electrodes is used for varying the oscillation frequency of the circuit. Measurement in the receiver of the emitted frequency then gives the desired measurement of the pH value. Between the two electrodes 4 and 6 and covering the battery chamber 5, is a semi-permeable layer 7, necessary for the cooperation of the electrodes 4 and 6.

As already mentioned above, if the electrode 3 is produced of an electrode material, for example, magnesium, an intense formation of hydrogen gas occurs both with and without current consumption from the battery. To eliminate this drawback, electrode 3 is produced from an alloy of an electrode material having a small percentage of a material reducing the gas formation. As an example, an electrode consisting of 98.5% magnesium and 1.5% manganese may be used. This construction per se causes a marked reduction of the gas formation at the electrode.

Further reduction of the gas formation is achieved by introducing the electrode 3, before mounting it in the endo-radiosonde, into an electrolyte, such as a common salt solution of, for example, 1%, and permitting it to lie therein for two hours, for example, and in any event for at least twenty minutes. In an electrode treated in this manner, gas formation occurs only when current is consumed from the battery. The small amount of hydrogen gas still being formed is bound by the pyrolusite layer surrounding the electrode 3. The pyrolusite surrounding the electrode 3 is powdery and would thus be continuously in motion whenever the endo-radiosonde moves. In order to keep this pyrolusite powder in the position shown, a layer of absorbent material 9, for example, a piece of blotting paper, is applied to the pyrolusite layer. At the same time, introducing this absorbent layer has the advantage of greatly expediting the mixture of the electrolyte and the pyrolusite powder when the electrolyte is introduced into the battery chamber 5.

However, using the pyrolusite in the form shown has the drawback that there is a lost current between the lower portion of the electrode 4 located in the pyrolusite layer 8 and the electrode 3. This lost current is due to impurities in the pyrolusite. In order to obviate this, the electrode 4 is insulated at its lower portion. This may be accomplished by using a layer of varnish 10, a rubber coating, or some other insulating layer.

The alloy used in the construction of electrode 3 is mostly magnesium with a small percentage of manganese added. The amount of manganese may vary from 0.5 to 2 percent with the remainder of magnesium, and preferably is about 1.5 percent.

Materials other than manganese may be used. For example, aluminum varying from 5 to 15 percent may be used with magnesium. Other materials, such as zinc, zircon may also be used with magnesium. In fact, a combination of these materials may be used with magnesium.

A specific example of the application of the present invention will now be given. An electrode is first formed of an alloy comprising 98.5 percent magnesium and 1.5 percent manganese. Then, this electrode is placed in a bath of an electrolyte, such as a salt solution at room temperature and for a period of two hours. Upon removal from this bath, the electrode may be incorporated into the battery.

Since electrolytes are well known, others suitable for use need not be specifically listed. The electrode may be treated in a bath of the electrolyte with which it is to be used in the battery.

It will be understood that the above description of the present invention is susceptible to various modifications, changes, and adaptations, and the same are intended to be comprehended within the meaning and range of equivalents of the appended claims.

What is claimed is:
1. In the manufacture of battery electrodes for endo-radiosondes of the type having a battery and battery electrodes, the improvement comprising the steps of: constructing one of the battery electrodes of an alloy of a usual electrode material and a small amount of a substance which reduces gas formation in a battery, and then treating this electrode with an electrolyte for at least twenty minutes.

2. The method of claim 1, wherein the usual electrode material is magnesium and the other substance is manganese.

3. In the manufacture of endo-radiosondes of the type including a housing, a transmitter in the housing, a sensing electrode on the housing connected to the transmitter and a battery having two electrodes and pyrolusite in the housing with the electrodes connected to the transmitter, the improvement comprising the steps of: constructing one of the battery electrodes of an alloy of a usual electrode material and a small amount of a substance which reduces gas formation in a battery, then treating this electrode with an electrolyte for at least twenty minutes, mounting this one electrode and another electrode in a battery housing containing pyrolusite, embedding said one electrode in the pyrolusite, and insulating the portion of said other electrode disposed in the pyrolusite.

4. In the manufacture of endo-radiosondes of the type having a battery, and battery electrodes, the improvement comprising the steps of: constructing one of the battery electrodes of an alloy of a usual electrode material and a small amount of a substance which reduces gas formation in a battery; and removing the capability of the electrode to form gas in the absence of current by treating it with an electrolytic material for at least twenty minutes.

5. In the manufacture of battery electrodes for endo-radiosondes of the type including a battery having electrodes and an electrolyte, the improvement comprising the steps of:
constructing one of the battery electrodes of an alloy of a usual electrode material and a small amount of a substance which reduces gas formation in a battery;
then placing this electrode into an electrolyte bath for at least twenty minutes; and
removing the electrode from the electrolyte bath and incorporating this treated electrode into the battery of the endo-radiosonde.

6. The method as defined in claim 5 wherein the electrode is in the electrolyte bath for from one to two hours.

References Cited by the Examiner
UNITED STATES PATENTS

| 1,602,915 | 10/26 | Little et al. | 136—100 |
| 2,620,368 | 12/52 | Ruben | 136—107 |
| 2,712,564 | 7/55 | Fry et al. | 136—100 |
| 3,007,993 | 11/61 | Haring | 136—100 |

OTHER REFERENCES

Mackay: "Radio Telemetering From Within the Human Body," IRE Transactions on Medical Electronics, vol. ME–6, No. 2, pp. 100–105, June 1959.

RICHARD A. GAUDET, *Primary Examiner.*

RICHARD J. HOFFMAN, *Examiner.*